(12) United States Patent
Katayanagi et al.

(10) Patent No.: US 12,067,431 B2
(45) Date of Patent: Aug. 20, 2024

(54) SERVICE COOPERATION SUPPORT APPARATUS, SERVICE COOPERATION SUPPORT METHOD AND SERVICE COOPERATION SUPPORT PROGRAM

(71) Applicant: Nippon Telegraph and Telephone Corporation, Tokyo (JP)

(72) Inventors: Ryota Katayanagi, Musashino (JP); Kensuke Takahashi, Musashino (JP); Satoshi Kondo, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 13 days.

(21) Appl. No.: 17/797,535

(22) PCT Filed: Feb. 6, 2020

(86) PCT No.: PCT/JP2020/004477
§ 371 (c)(1),
(2) Date: Aug. 4, 2022

(87) PCT Pub. No.: WO2021/156992
PCT Pub. Date: Aug. 12, 2021

(65) Prior Publication Data
US 2023/0068545 A1  Mar. 2, 2023

(51) Int. Cl.
*G06F 7/06* (2006.01)
*G06F 9/54* (2006.01)
*G06F 13/16* (2006.01)

(52) U.S. Cl.
CPC .................... *G06F 9/545* (2013.01)

(58) Field of Classification Search
CPC .......... G06F 9/545; G06F 9/547; G06F 9/541; G06F 9/44
See application file for complete search history.

(56) References Cited

U.S. PATENT DOCUMENTS 11,922,229 B2 * 3/2024 Reineke ............... G06F 9/54
2006/0245358 A1 * 11/2006 Beverly ............... H04L 47/13
370/235

(Continued)

FOREIGN PATENT DOCUMENTS

JP  2018206050  12/2018

OTHER PUBLICATIONS

Katayanagi et al., "A Study on the Method of Service Cooperation Independent of API Characteristics," Electronic Information and Communication Society Network Software Study Group, Oct. 25, 2019, 3 pages (with English Translation).

(Continued)

*Primary Examiner* — Kevin L Young
*Assistant Examiner* — Abdou K Seye
(74) *Attorney, Agent, or Firm* — Fish & Richardson P.C.

(57) ABSTRACT

A service linkage assistance device includes a reception unit, which receives definition information of a stateless upper-layer API exposed to an upper-layer device that links a plurality of services and definition information of a plurality of stateful lower-layer APIs exposed by a lower-layer device. The service linkage assistance device includes an interpretation unit, which extracts at least one lower-layer API corresponding to the upper-layer API by using the definition information of the upper-layer API and the definition information of the lower-layer APIs, and generates an API correspondence table in which an execution order of the extracted lower-layer API is set.

7 Claims, 15 Drawing Sheets

(56) References Cited

U.S. PATENT DOCUMENTS

2009/0254602 A1* 10/2009 Yoshida ................ G06F 3/1211
709/202
2017/0280007 A1* 9/2017 Sugimura .......... H04N 1/00204
2020/0089617 A1* 3/2020 Onishi ................ G06F 12/0246

OTHER PUBLICATIONS

Take et al., "Method to Simplify API Adapter Development using GUI," IEICE 2018 Society Tournament, Sep. 11, 2018, 3 pages (with English Translation).

* cited by examiner

Fig. 10

SERVICE COOPERATION SUPPORT APPARATUS, SERVICE COOPERATION SUPPORT METHOD AND SERVICE COOPERATION SUPPORT PROGRAM

CROSS-REFERENCE TO RELATED APPLICATIONS

This application is a National Stage application under 35 U.S.C. § 371 of International Application No. PCT/JP2020/004477, having an International Filing Date of Feb. 6, 2020, the disclosure of which is considered part of the disclosure of this application, and is incorporated by reference in its entirety into this application.

TECHNICAL FIELD

The present invention relates to a service linkage assistance device, a service linkage assistance method, and a service linkage assistance program.

BACKGROUND ART

With diversification of communication services, the importance of a linkage service in which a plurality of types of services are linked to each other is increased, and it is desired to cope with the emergence of a new service related to the linkage service and the change of a specification of an existing service in a short period of time at low cost.

In order to cope with such changes, there is a technique in which a catalog management unit which defines a service specification and an API specification and an adaptor which executes an API based on these specifications are loosely coupled, and cost for coping with the new service or the change of the specification of the existing service is thereby reduced (PTL 1).

In addition, with regard to development facilitation of such an adaptor, a technique for generating the adaptor by using a GUI is present (NPL 1). In addition, linkage between services which is not dependent on characteristics of the API is also studied (NPL 2).

CITATION LIST

Patent Literature

[PTL 1] Japanese Patent Application Publication No. 2018-206050

Non Patent Literature

[NPL 1] Take Naoki, 5 others, "*GUI wo mochiita API adaptor kaihatsu youika houshiki ni kansuru ichi kentou* (A Study on API Adaptor Development Facilitation Method using GUI)", the IEICE Society Conference, B-14-13, IEICE, Sep. 11 to 14, 2018
[NPL 2] Katayanagi Ryota, 2 others, "*API no tokusei ni izon shinai service kan renkei no jitsugen houshiki ni kansuru ichi kentou* (A Study on Implementation Method of Inter-Service Linkage which is not dependent on Characteristics of API)", IEICE Steering Committee on Network Software, Oct. 25, 2019

SUMMARY OF THE INVENTION

Technical Problem

A technique for associating a stateless API on an upper-layer device side with a stateful API on a lower-layer device side in the linkage of a plurality of services does not exist. Accordingly, mapping processing which determines which API on the lower-layer device side is executed in what order by using a request of the API on the upper-layer device side as a trigger needs to be designed manually by a linkage service provider or the like. Accordingly, it is not easy to implement the mapping processing and the implementation of the mapping processing requires cost and time.

The present invention has been made in view of the above circumstances, and an object of the present invention is to provide a service linkage assistance device, a service linkage assistance method, and a service linkage assistance program which facilitate mapping between a stateless API on an upper-layer device side and a stateful API on a lower-layer device side.

Means for Solving the Problem

In order to attain the above object, an aspect of the present invention is a service linkage assistance device including: a reception unit which receives definition information of a stateless upper-layer API exposed to an upper-layer device which links a plurality of services and definition information of a plurality of stateful lower-layer APIs exposed by a lower-layer device; and an interpretation unit which extracts at least one lower-layer API corresponding to the upper-layer API by using the definition information of the upper-layer API and the definition information of the lower-layer APIs, and generates an API correspondence table in which an execution order of the extracted lower-layer API is set.

An aspect of the present invention is a service linkage assistance method performed by a service linkage assistance device, the service linkage assistance method including: a reception step of receiving definition information of a stateless upper-layer API exposed to an upper-layer device which links a plurality of services and definition information of a plurality of stateful lower-layer APIs exposed by a lower-layer device; and a generation step of extracting at least one lower-layer API corresponding to the upper-layer API by using the definition information of the upper-layer API and the definition information of the lower-layer APIs, and generating an API correspondence table in which an execution order of the extracted lower-layer API is set.

An aspect of the present invention is a service linkage assistance program for causing a computer to function as the above-described service linkage assistance device.

Effects of the Invention

According to the present invention, it is possible to provide the service linkage assistance device, the service linkage assistance method, and the service linkage assistance program which facilitate the mapping between the stateless API on the upper-layer device side and the stateful API on the lower-layer device side.

BRIEF DESCRIPTION OF DRAWINGS

FIG. 10 is an explanatory view for explaining the specific generation procedure of the API correspondence table.

DESCRIPTION OF EMBODIMENTS

Hereinbelow, a description will be given of an embodiment of the present invention with reference to the drawings.

Configuration of Service Linkage System

Figure 1:
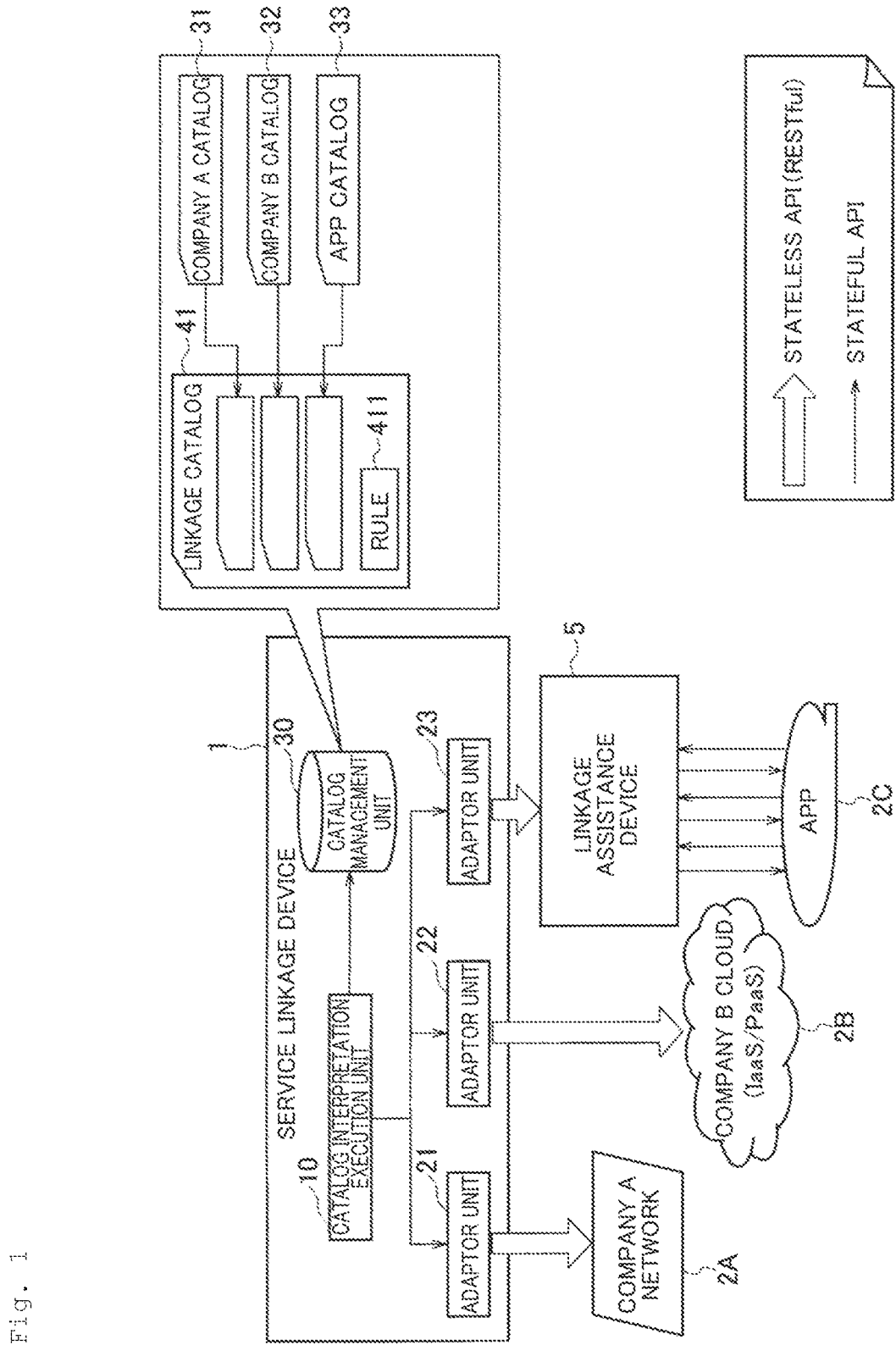
FIG. 1 is a view showing an example of the configuration of a service linkage system of an embodiment of the present invention.

FIG. 1 is a configuration diagram of a service linkage system of the present embodiment. The service linkage system shown in the drawing includes a service linkage device 1, a plurality of services 2A, 2B, and 2C, and a linkage assistance device 5 (service linkage assistance device).

The service linkage device 1 is a device which executes a linkage service in which a plurality of types of services are linked to each other. As the plurality of types of services, three services 2A, 2B, and 2C are shown in FIG. 1. The service 2A is a network service provided by Company A (service provider). The service 2B is a service provided by Company B (service provider), and is a cloud service such as IaaS (Infrastructure as a Service) or PaaS (Platform as a Service). The service 2C is a service of a Web application (hereinafter referred to as "app") provided by Company C (service provider). Note that the number and types of services handled in the present invention are not limited to those described above.

Herein, each of the services 2A and 2B is a service which has a stateless API and is exposed (provided) (hereinafter also referred to as "stateless service"). On the other hand, the service 2C is a service which has a stateful API and is exposed (hereinafter also referred to as "stateful service").

The stateless (RESTful) denotes a communication method in which a server does not retain an internal state (dynamic information) such as session information with a client. Accordingly, the stateless communication method is a self-contained method in which all information required for execution (processing) of the API is included in a request a client. The stateful communication method is a communication method in which the server retains the internal state such as the session information with the client, and the internal state is appropriately consulted when the API is executed.

In the present embodiment, it is assumed that the service 2C which exposes the stateful API and the services 2A and 2B which expose the stateless APIs are linked to each other to constitute one linkage service. That is, in the present embodiment, the service linkage device 1 executes the linkage service in which a plurality of services including the service 2C which exposes the stateful API are linked to each other.

The service linkage device 1 of the present embodiment realizes the linkage service in which a plurality of services are linked to each other irrespective of the communication methods (stateless, stateful) of the APIs of the services which are linked to each other. Herein, the service linkage device 1 executes the linkage service in which a plurality of services including the app service 2C which exposes the stateful API are linked to each other. The service linkage device 1 shown in the drawing includes a catalog interpretation execution unit 10, adaptor units 21 to 23, and a catalog management unit 30.

The catalog management unit 30 manages a catalog (Product catalog) in which the specification of the service is defined. The catalog is stored in, e.g., a storage unit (not shown) of the catalog management unit 30. FIG. 1 shows a Company A catalog 31, a Company B catalog 32, and an app catalog 33 for a plurality of the services 2A, 2B, and 2C. The catalog handled in the present invention is not limited to those described above. The catalog is prepared for each service. In the case where a new service is additionally provided, the catalog corresponding to the service is prepared, and the catalog management unit 30 registers the catalog in the storage unit and manages the catalog.

The catalog management unit 30 creates a linkage catalog serving as a catalog for a linkage service by combining a plurality of catalogs of a plurality of services constituting the linkage service, and stores the linkage catalog in the storage unit. In FIG. 1, the catalog management unit 30 creates a linkage catalog 41 in which the Company A catalog 31, the Company B catalog 32, and the app catalog 33 are combined, and stores the linkage catalog 41 in the storage unit. The linkage catalog 41 defines a specification of the linkage service including three services 2A, 2B, and 2C. In addition, the linkage catalog 41 includes a rule 411. The rule 411 is a rule related to coordination operations between the individual services constituting the linkage service.

In the case where a request for a linkage service is made from a client (not shown) of a customer of a service provider, the catalog interpretation execution unit 10 interprets the contents of the catalog in the linkage catalog of the linkage service, and processes the request. The catalog interpretation execution unit 10 interprets all catalogs included in the linkage catalog, and processes the request. The catalog interpretation execution unit 10 can be said to be a functional unit which does not depend on each service corresponding to the catalog and executes common processing in inter-service linkage.

Each of the adaptor units 21 to 23 executes the API of each service constituting the linkage service, and processes the request from the client. The adaptor units 21 to 23 are provided for the services individually and, in the case where a new service is additionally provided, the service linkage device 1 additionally provides a new adaptor unit. Each of the adaptor units 21 to 23 can be said to be a functional unit which processes the request which depends on an API specification of each service.

In the service linkage device 1 of the present embodiment, in the case where a new service becomes a service to be Linked in the linkage service, it is only necessary to prepare the catalog and the adaptor unit corresponding to the new service. Accordingly, it is not necessary to additionally develop the entire service linkage device 1, and it is possible to reduce supplemental cost when the new service and the new API are added to the linkage service.

In addition, in the service linkage device 1 of the present embodiment, a group of services constituting the linkage service can be configured as a catalog-driven loosely coupled architecture by using the catalog.

The linkage assistance device 5 is a device for easily linking the stateful service which exposes the stateful API to another service. Note that the service linkage system may include separate linkage assistance devices 5 for stateful services individually. Alternatively, the service linkage system may include one linkage assistance device 5 for a plurality of stateful services, and the linkage assistance device 5 may expose the stateless API for each service.

Configuration of Linkage Assistance Device

Figure 2:
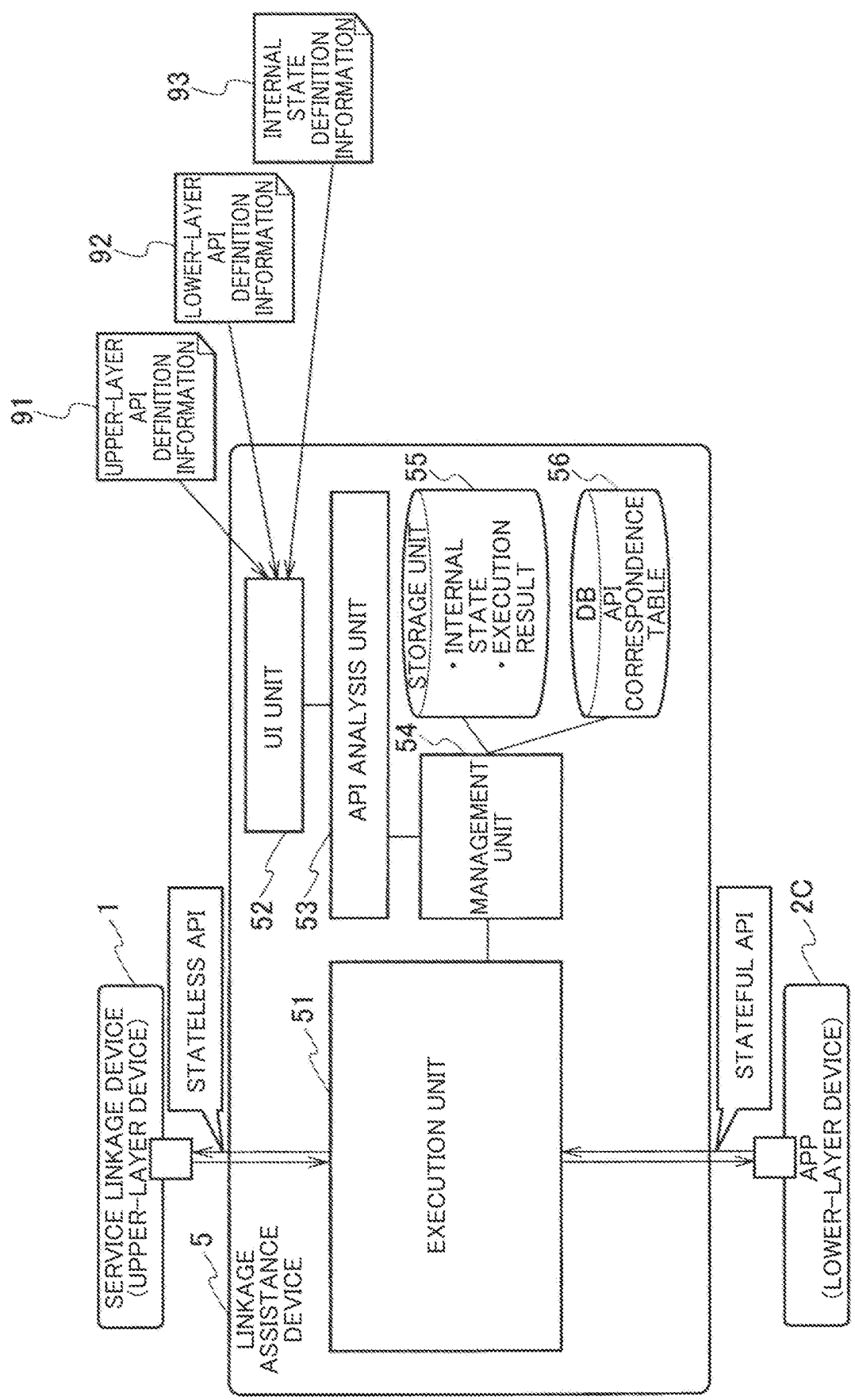
FIG. 2 is a block diagram showing the configuration of a linkage assistance device.

FIG. 2 is a block diagram showing the configuration of the linkage assistance device 5 of the present embodiment. The linkage assistance device 5 of the present embodiment automatically generates an API correspondence table which shows a correspondence (mapping) between a stateless upper-layer API of an upper-layer device and a stateful lower-layer API of a lower-layer device, and controls execution of the stateful lower-layer API based on the API correspondence table. Specifically, the linkage assistance device 5 performs mapping processing of the upper-layer API and the lower-layer API in response to input of definition information, and generates the API correspondence table. Subsequently, the linkage assistance device 5 selects, for a request of the stateless upper-layer API from the upper-layer device, the corresponding stateful lower-layer API by using the automatically generated API correspondence table, and executes the lower-layer API in a set order.

With this, the linkage assistance device 5 of the present embodiment can assist realization of the linkage service which includes not only the service which exposes the stateless lower-layer API but also the service which exposes the stateful lower-layer API in a short period of time at low cost.

The linkage assistance device 5 shown in the drawing includes an execution unit 51, a UI unit 52 (user interface unit), an API analysis unit 53, a management unit 54, a storage unit 55, and a DB (database) 56 which stores the API correspondence table.

The execution unit 51 identifies the stateful lower-layer API corresponding to the upper-layer API by using the API correspondence table in response to the request from the service linkage device 1 (upper-layer device), and executes the identified lower-layer API in an order specified by the API correspondence table. Specifically, the execution unit 51 receives the request of the stateless upper-layer API for the stateful service from the service linkage device 1 which executes the linkage service in which a plurality of services including the stateful service are linked to each other, maps the request to the lower-layer API by using the API correspondence table, and executes the lower-layer API. The upper-layer API is a stateless API which is exposed to the service linkage device 1 by the linkage assistance device 5.

The execution unit 51 may notify the service linkage device 1 of execution completion of the lower-layer API and urge the service linkage device 1 to acquire an execution result of the lower-layer API. The execution unit 51 may cause an internal state stored in the storage unit 55 to be included in second and subsequent requests for the lower-layer API.

The UI unit 52 receives input of upper-layer API definition information 91, lower-layer API definition information 92, and internal state definition information 93. The upper-layer API definition information 91 is definition information of the stateless upper-layer API exposed to the service linkage device 1 (upper-layer device) which links a plurality of services. The lower-layer API definition information 92 is definition information of a plurality of the stateful lower-layer APIs which are exposed by the app service 2C (lower-layer device). The internal state definition information 93 is definition information of the internal state of the app service 2C which is consulted when the lower-layer API is executed.

The API analysis unit 53 extracts at least one lower-layer API corresponding to the upper-layer API by using the upper-layer API definition information 91 and the lower-layer API definition information 92, and generates the API correspondence table in which an execution order of the extracted lower-layer API is set. That is, the API analysis unit 53 analyzes a correspondence between the stateless upper-layer API and the stateful lower-layer API, and performs mapping. In addition, the API analysis unit 53 may generate the API correspondence table by using the internal state definition information 93.

The API analysis unit 53 extracts the lower-layer API which outputs output information of the upper-layer API and, in the case where input information of the extracted lower-layer API has only input information of the upper-layer API, the execution order of the lower-layer API may be given priority over those of the other lower-layer APIs.

The management unit 54 manages the storage unit 55 and the DB 56. The internal state included in a response of the stateful lower-layer API is stored in the storage unit 55. The internal state is information which is required for execution of the lower-layer API and is provided by notification from the lower-layer device on a service side (herein, a server of the app service 2C) when the lower-layer API is executed. The internal state may include session information (e.g., Cookie) of the linkage assistance device 5 and the lower-layer device which provides the stateful service. In addition, the execution result of the lower-layer API is stored in the storage unit 55. The API correspondence table generated by the API analysis unit 53 is stored in the DB 56.

Operation Outline of Linkage Assistance Device 5

The linkage assistance device 5 assists the linkage between the service 2C which exposes the stateful lower-layer API and other services without losing merits of the service linkage device 1. The first merit is that it is possible to reduce adaptation cost for addition of a new service or change of a specification of an existing service by loosely coupling the catalog management unit 30 and the adaptor unit 23. The second merit is that it is possible to implement the adaptor unit 23 for the stateless upper-layer API to which the development facilitation technique in NPL 1 is applied in the service linkage device 1 even for the service 2C which exposes the stateful lower-layer API, and it is possible to reduce development cost for the adaptor unit 23.

Accordingly, the linkage assistance device 5 exposes the stateless upper-layer API on an upper-layer side (Northbound), and receives the request from the service linkage device 1. When viewed from the linkage assistance device 5, the upper-layer API is an API which is exposed to the service linkage device 1 (upper-layer device) which manages and operates the device 5.

For the purpose of allowing the service linkage device 1 to operate the stateful service indirectly via the linkage assistance device 5, the linkage assistance device 5 implements the upper-layer API for each stateful service, and exposes the upper-layer API to the service linkage device 1. The upper-layer API is generated in advance according to the stateful API on the service side and the specification of the catalog, and is implemented in the execution unit 51 of the linkage assistance device 5.

The linkage assistance device 5 maps the request of the upper-layer API transmitted from the service linkage device 1 to the stateful lower-layer API on a lower-layer side (Southbound) by using the API correspondence table, and executes the lower-layer API. The lower-layer API is an API exposed by a lower-layer device which is to be operated when viewed from the linkage assistance device 5.

Figure 3:
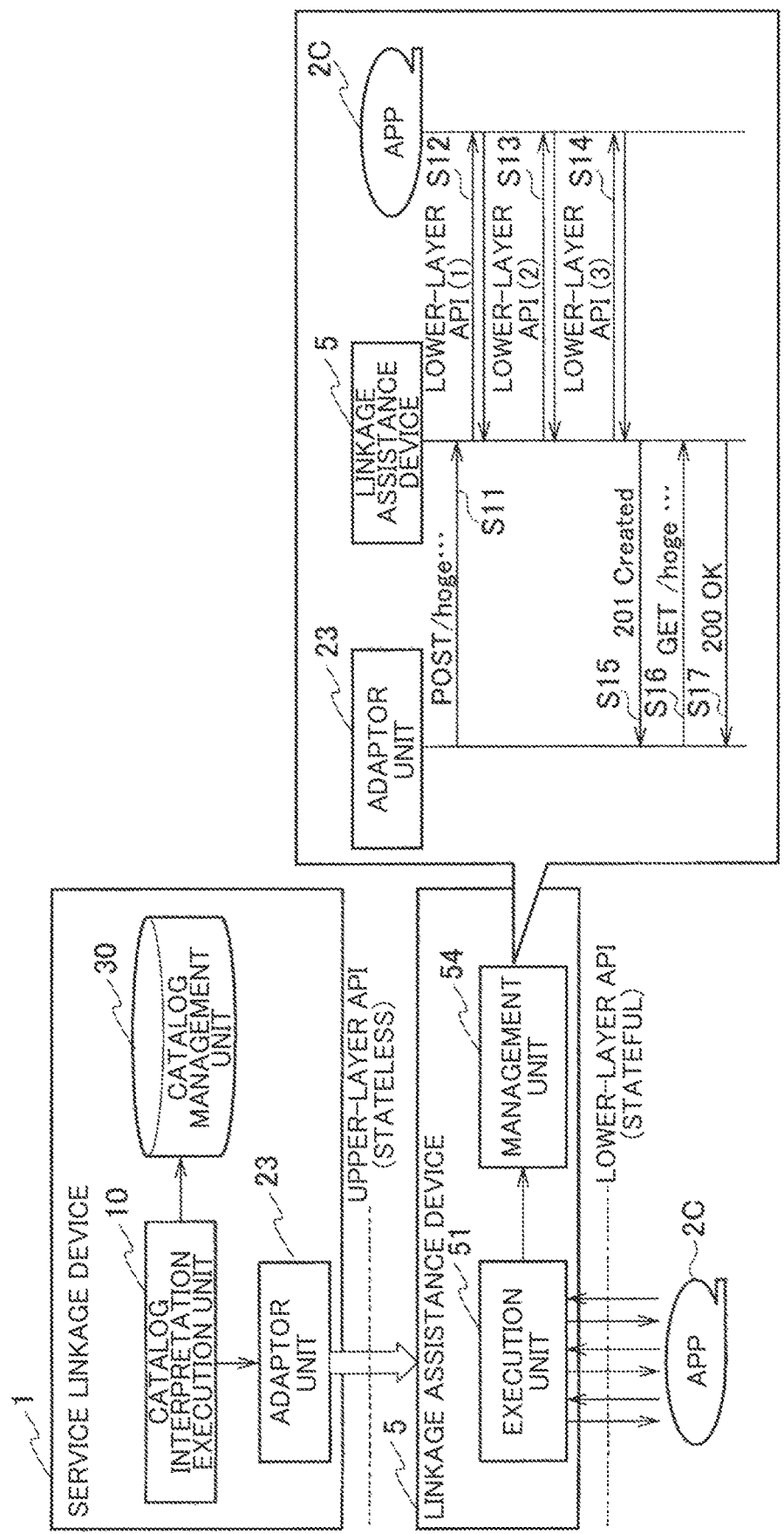
FIG. 3 is an explanatory view for explaining preconditions of the service linkage system.

FIG. 3 is a view showing an operation outline of the service linkage system. In an example shown in the drawing, the stateless upper-layer API exposed by the linkage assistance device 5 includes an API for providing an instruction to execute the stateful lower-layer API and an API for acquiring the execution result. Accordingly, the adaptor unit 23 shown in the drawing transmits an instruction request for execution of the stateful API and a result acquisition request for acquiring the execution result to the linkage assistance device 5.

In response to the request of the upper-layer API from the adaptor unit 23, the linkage assistance device 5 executes the stateful API of the lower-layer device corresponding to the request, and returns the execution result to the adaptor unit 23. At this point, the linkage assistance device 5 determines the lower-layer API corresponding to the request of the adaptor unit 23 based on the correspondence between the upper-layer API and the lower-layer API set in the API correspondence table.

As shown in the drawing, the adaptor unit 23 transmits a request (POST method) for providing an instruction to execute the lower-layer APIs of the app service 2C to the linkage assistance device 5 via the upper-layer API (S11). The linkage assistance device 5 sequentially executes the lower-layer APIs of the app service 2C corresponding to the request according to the API correspondence table (S12 to S14). The linkage assistance device 5 retains the execution result in the storage unit 55. After the completion of the execution of the lower-layer APIs, the linkage assistance device 5 notifies the service linkage device 1 that the linkage assistance device 5 retains the execution result (S15). Specifically, the linkage assistance device 5 transmits "201 Created" (normal response) indicating that the request has been fulfilled and creation of resources has been completed to the service linkage device 1.

When the adaptor unit 23 of the service linkage device 1 receives the response in S15, the adaptor unit 23 transmits a request (GET method) for acquiring the execution result to the linkage assistance device 5 (S16). The linkage assistance device 5 transmits the execution result retained in the storage unit 55 to the service linkage device 1 together with 200 OK (normal response) (S17). The adaptor unit 23 stores the acquired execution result in a characteristic of the catalog.

The catalog of the stateful service of the service linkage device 1 needs the characteristic (attribute) which stores the execution result of the linkage assistance device 5. The service linkage device defines the characteristic which stores the execution result in a Product catalog of the stateful app service 2C.

In FIG. 3, the case where two APIs (the API which provides the instruction to execute the lower-layer API and the API which acquires the execution result) are included in the upper-layer API has been described, but the present embodiment is not limited thereto. The purpose of causing the management unit 54 of the linkage assistance device 5 to manage the execution result of the lower-layer API in the storage unit 55 is to temporarily store the execution result thereof until all pieces of "output information" included in the upper-layer API definition information 91 are prepared by the completion of execution of all of the corresponding lower-layer APIs, and to temporarily store the execution result thereof until, when a dependence relationship in which a given lower-layer API needs execution results of the other lower-layer APIs as input information is established, all pieces of input information (the execution results of the other lower-layer APIs) required for the execution of the lower-layer API are prepared.

Accordingly, it is also possible to perform design such that, at a timing when all pieces of the output information included in the upper-layer API definition information 91 which provides the instruction to execute the lower-layer API are prepared under the management unit 54 (or any timing), the execution result of the corresponding lower-layer API is included in the output information of the upper-layer API. For example, the execution result obtained by the instruction to execute the lower-layer API can be included in a response to the upper-layer API (POST method).

Definition Information

Figure 4:
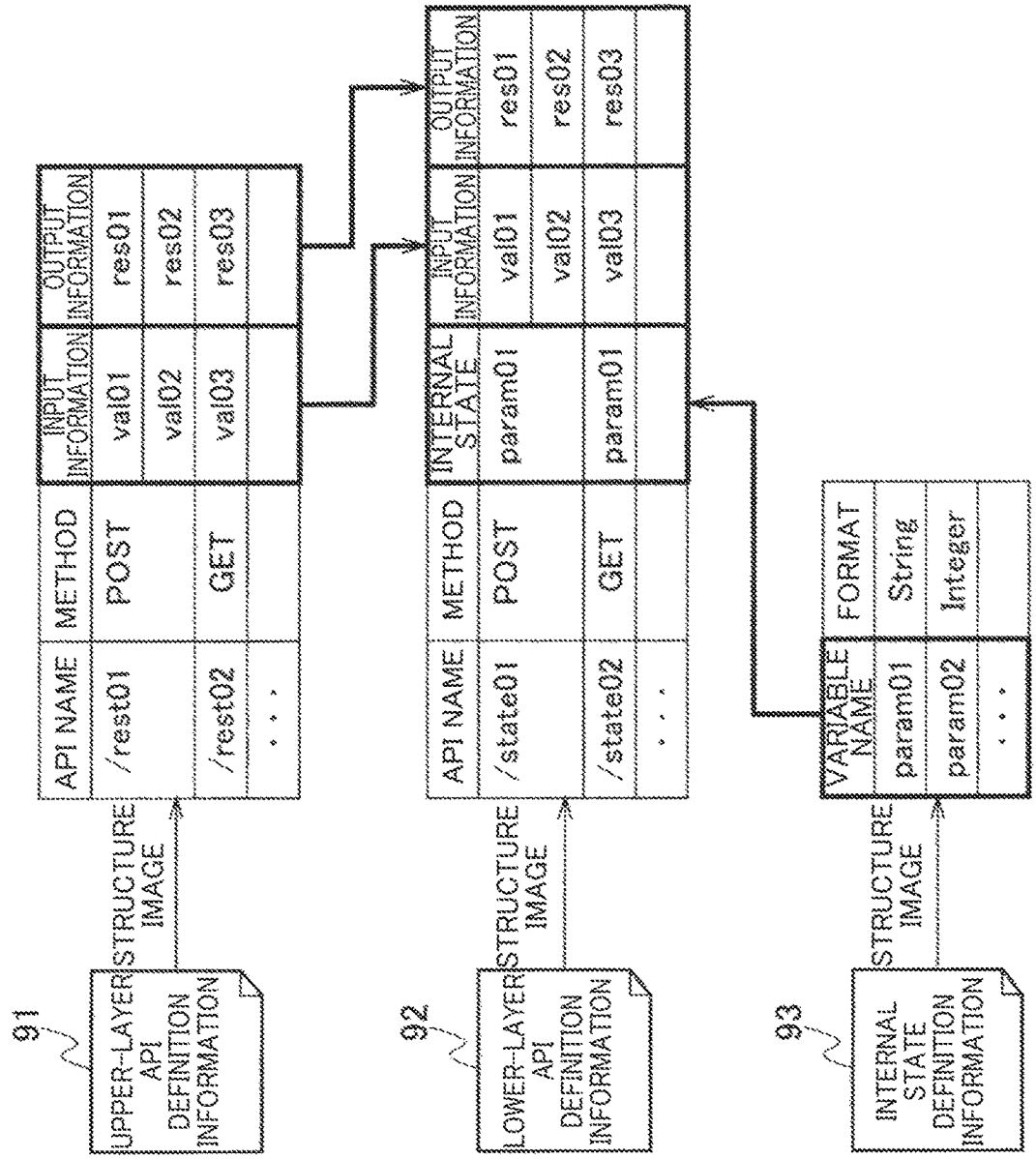
FIG. 4 shows examples of a data structure of definition information.

FIG. 4 shows examples of a data structure of the definition information of the present embodiment. Herein, a description will be given of structure images of the upper-layer API definition information 91, the lower-layer API definition information 92, and the internal state definition information 93 input to the linkage assistance device 5.

The upper-layer API definition information 91 is definition information of the stateless upper-layer API provided to the upper-layer device by the linkage assistance device 5. The upper-layer API definition information 91 retains an API name, a method, input information, and output information for each combination of the API to be exposed and the method. The input information and the output information of the upper-layer API definition information 91 are set according to naming conventions of the lower-layer API in order to identify a relation with the lower-layer API definition information 92.

The lower-layer API definition information 92 is definition information of the stateful lower-layer API provided by the lower-layer device. The lower-layer API definition information 92 retains the API name, the method, the internal state, the input information, and the output information for each combination of the API to be exposed and the method. Note that, in the lower-layer API which does not refer to the internal state, the section of the internal state is blank.

The internal state definition information 93 is definition information of the internal state of the lower-layer device (e.g., session information or the like) when the stateful lower-layer API is executed. The internal state definition information 93 is retained as a pair of a variable name and a data format. The variable name is set according to naming conventions of the lower-layer API in order to identify a relation with the lower-layer API definition information 92.

Generation of API Correspondence Table

Figure 5:
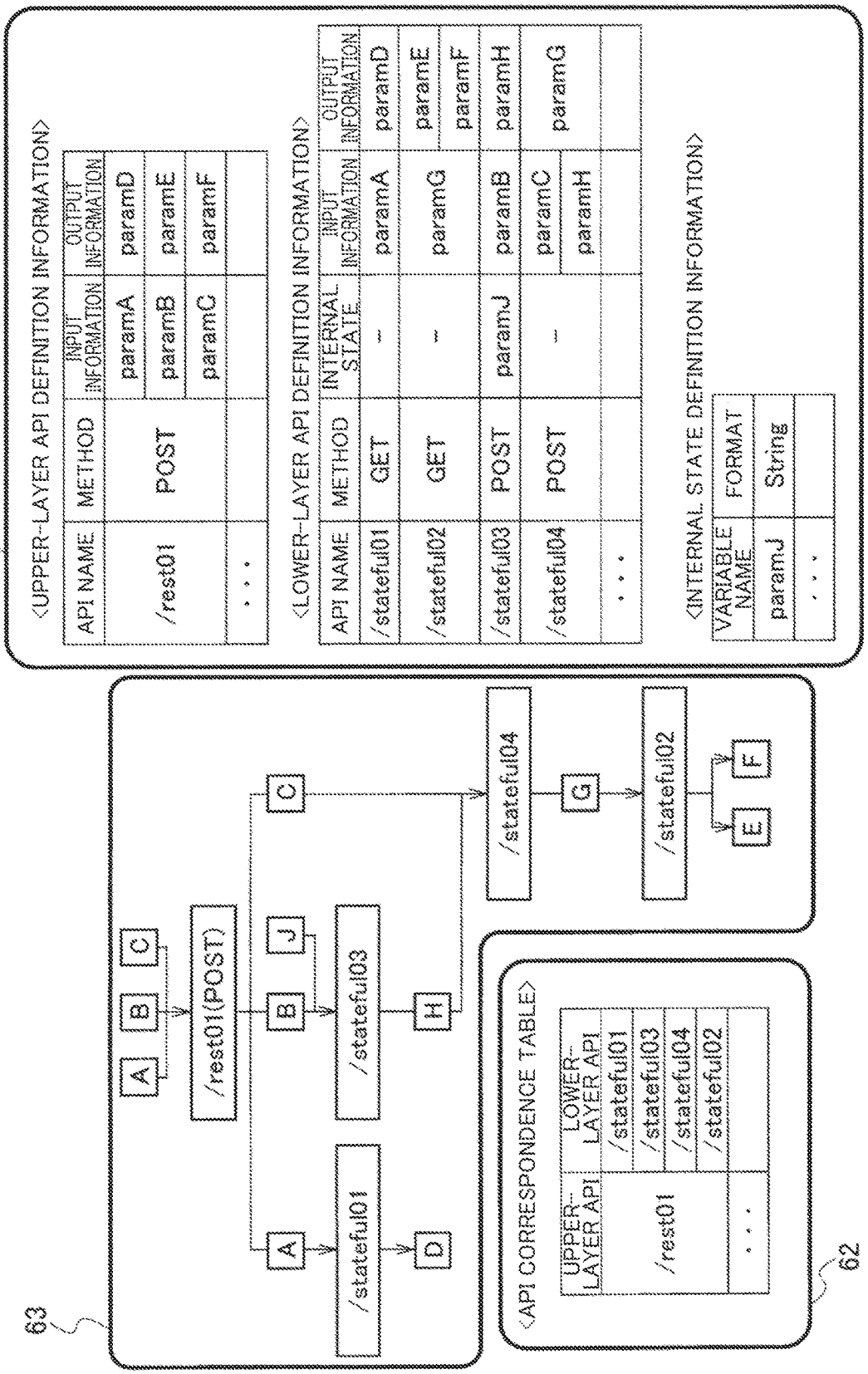
FIG. 5 is an explanatory view for explaining a specific generation procedure of an API correspondence table.

Each of FIGS. 5 to 11 is an explanatory view for explaining a specific generation procedure of the API correspondence table. As shown in FIG. 5, the linkage assistance device 5 (API analysis unit 5) generates an API correspondence table 62 by using definition information 61 (the upper-layer API definition information 91, the lower-layer API definition information 92, and the internal state definition information 93) which are input via the UI unit 52. An input-output correspondence image 63 is an image diagram showing a relationship between the upper-layer API (herein, "/rest01") and each lower-layer API for the sake of convenience.

Figure 6:
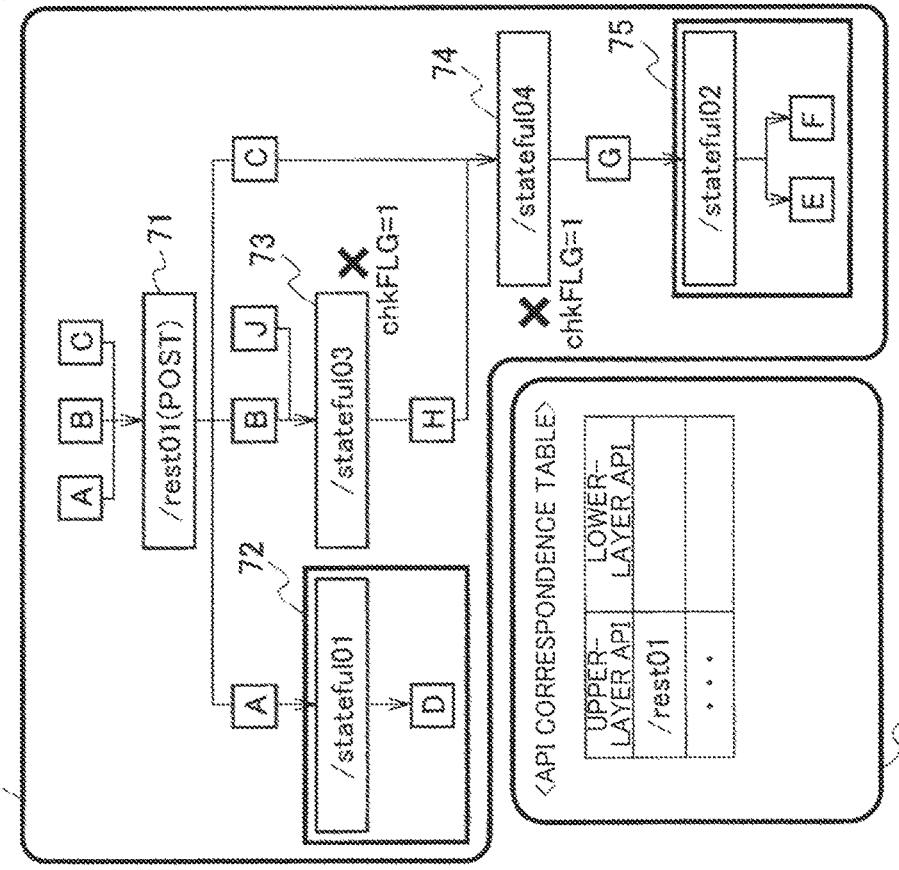
FIG. 6 is an explanatory view for explaining the specific generation procedure of the API correspondence table.

As shown in FIG. 6, the linkage assistance device 5 extracts the lower-layer API which outputs part of or all pieces of the output information of an upper-layer API 71 by using definition information 61. The linkage assistance device 5 sets a checked FLG (chkFLG=1) in the lower-layer API which does not correspond to the above lower-layer API. In FIG. 6, lower-layer APIs 72 and 75 are extracted, and the checked FLG is set in each of lower-layer APIs 73 and 74. The API correspondence table 62 in FIG. 6 is in an initial state, the name of the upper-layer API to be processed is set in the upper-layer API, and the lower-layer API is blank.

Figure 7:
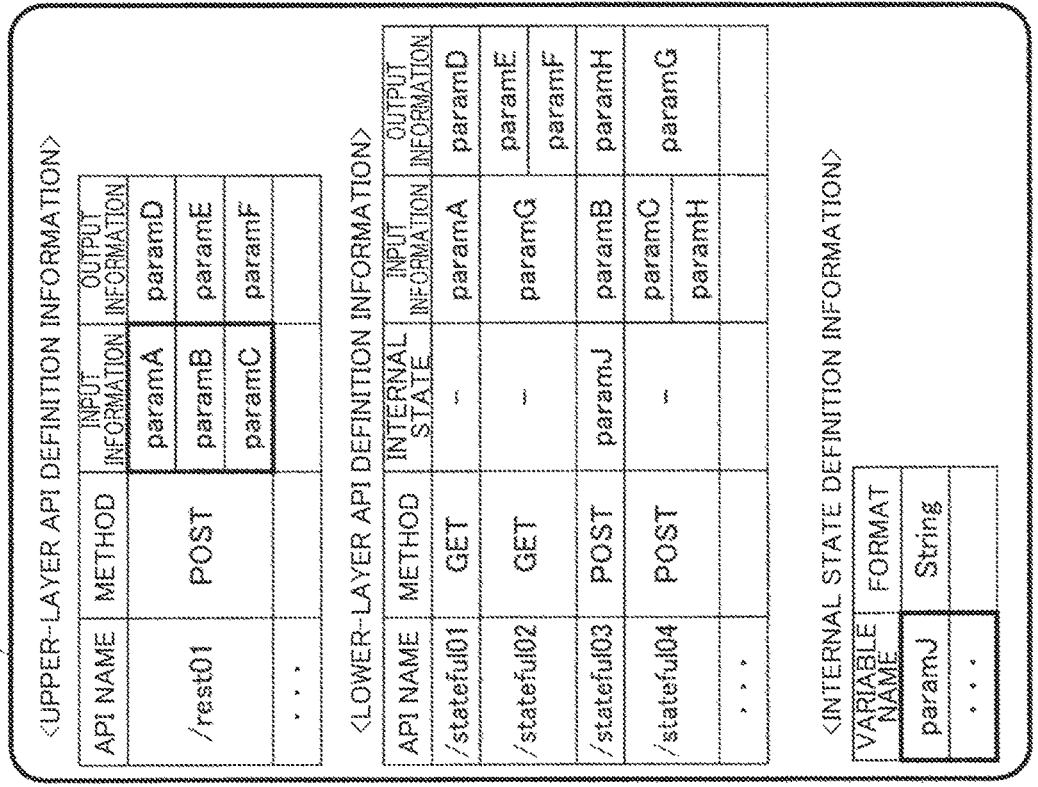
FIG. 7 is an explanatory view for explaining the specific generation procedure of the API correspondence table.
Figure 7:
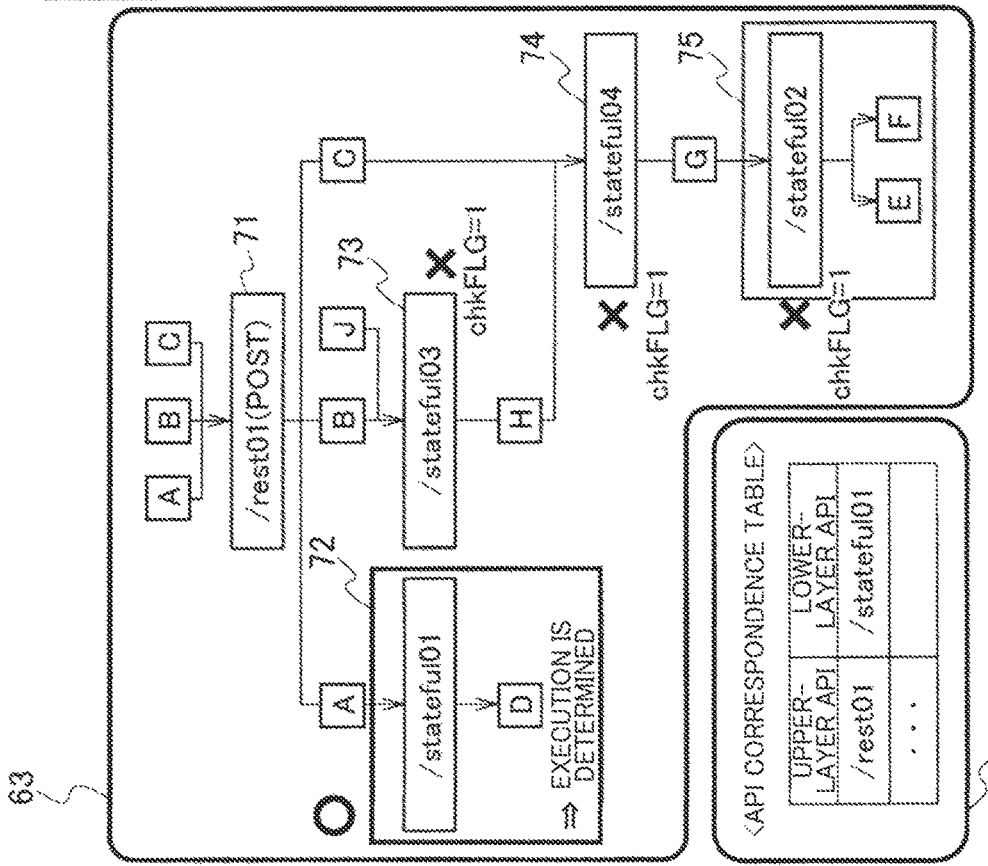

Next, as shown in FIG. 7, the linkage assistance device 5 determines whether or not, of the set of the extracted lower-layer APIs 72 and 75, the lower-layer API 75 which returns the largest number of pieces of the output information can be executed. Specifically, the linkage assistance device 5 determines whether or not the lower-layer API 75 can be executed only with the input information of the upper-layer API definition information and the internal state definition information. The lower-layer API 75 receives "paramG" which does not correspond to the input information of the upper-layer API 71 or the internal state as input, and the input information for executing the lower-layer API 75 is insufficient at the moment. Accordingly, the linkage assistance device 5 determines that the lower-layer API 75 cannot be executed at the moment, and sets the checked FLG in the lower-layer API 75.

Next, the linkage assistance device 5 determines whether or not the extracted lower-layer API 72 can be executed. The input information of the lower-layer API 72 is input information "paramA" of the upper-layer API 71. Accordingly, the linkage assistance device 5 determines that the lower-layer API 72 can be executed only with the input information of the upper-layer API 71 and the internal state definition information, and determines the execution of the lower-layer API 72. Subsequently, the linkage assistance device 5 sets the API name "/stateful01" of the lower-layer API 72 of which the execution is determined in the lower-layer API of the API correspondence table 62. The lower-layer API 72 is the lower-layer API of which the execution is determined first, and hence the linkage assistance device 5 sets the lower-layer API 72 as the first lower-layer API in the lower-layer API section.

Thus, the linkage assistance device 5 extracts the lower-layer API 72 which outputs the output information of the upper-layer API 71 and, in the case where the input information of the extracted lower-layer API 72 has only the input information of the upper-layer API 71, the execution order of the lower-layer API 72 is given priority over those of the other lower-layer APIs by the linkage assistance device 5.

The checked FLG is set in each of the remaining lower-layer APIs, and hence the linkage assistance device 5 verifies requirement satisfaction in the linkage between the lower-layer APIs next.

Figure 8:
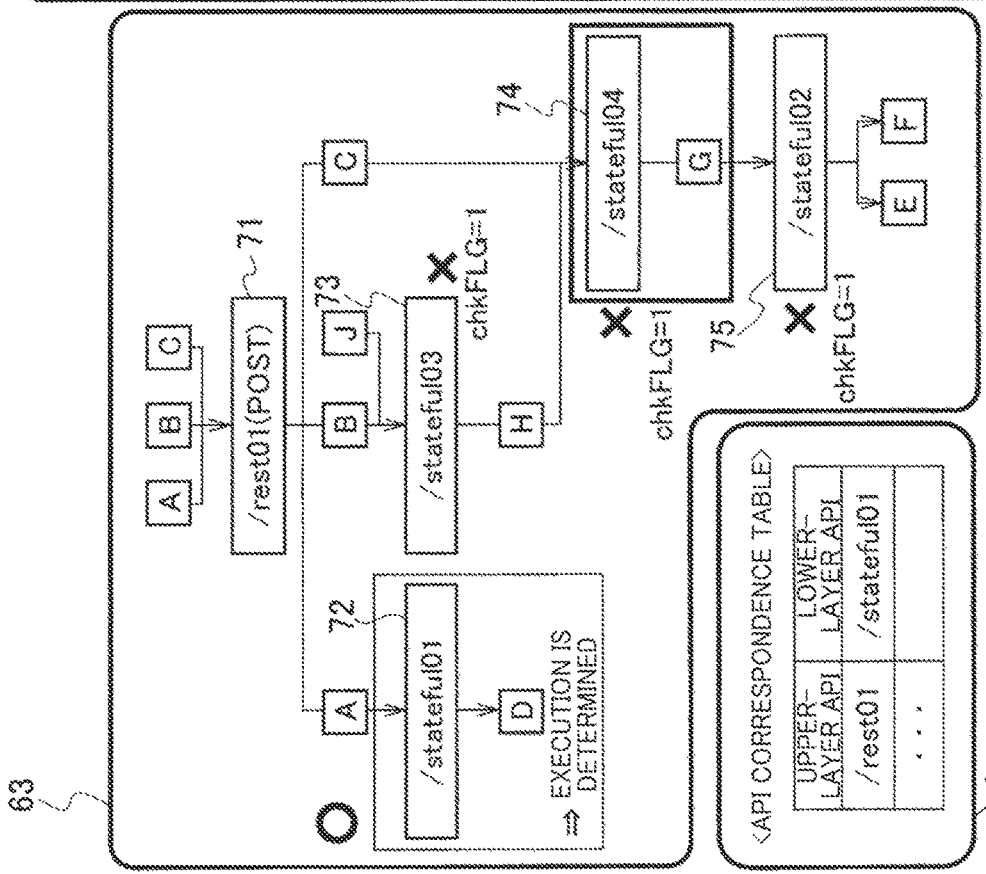
FIG. 8 is an explanatory view for explaining the specific generation procedure of the API correspondence table.

As shown in FIG. 8, the linkage assistance device 5 focuses attention on input information ("paramG") of the lower-layer API 75 which outputs output information 81 ("paramE", "paramF") of the upper-layer API 71, and extracts the lower-layer API 74 which outputs the input information. The linkage assistance device 5 acquires input information ("paramC", "paramH") of the extracted lower-layer API 74. While "paramC" is included in the input information of the upper-layer API 71, "paramH" is not included in any of the input information of the upper-layer API 71, the internal state definition information, and the output information of the lower-layer APIs registered in the API correspondence table. Accordingly, the linkage assistance device 5 refers to the lower-layer API definition information in the definition information 61 to acquire the lower-layer API 73 which has "paramH" as the output information, and determines whether or not the lower-layer API 73 can be executed.

Figure 9:
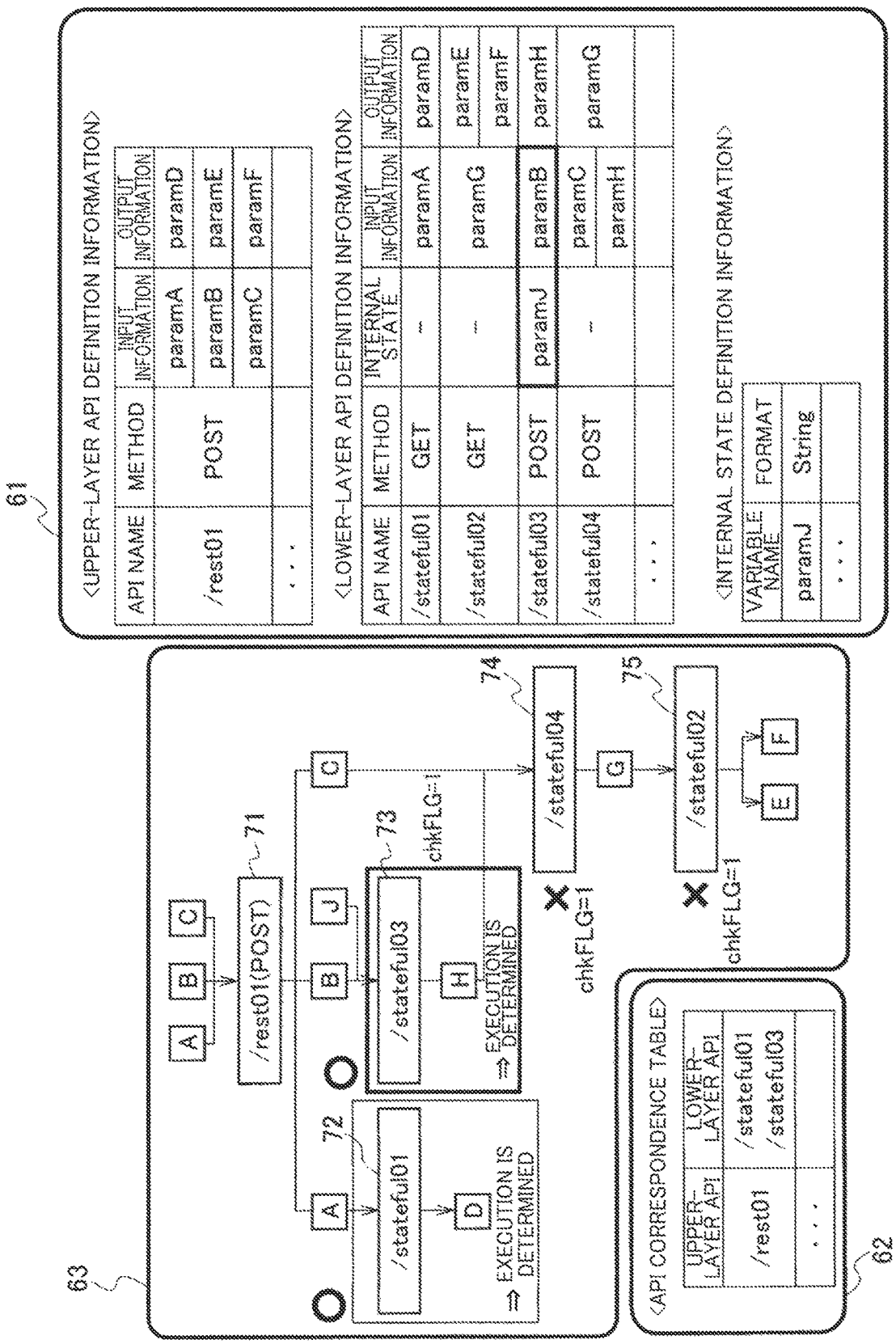
FIG. 9 is an explanatory view for explaining the specific generation procedure of the APT correspondence table.

As shown in FIG. 9, the input information ("paramB", "paramJ") of the lower-layer API 73 corresponds to the input information of the upper-layer API 71 and the internal state definition information. That is, the input information of the lower-layer API 73 is included in any of the input information of the upper-layer API 71, the internal state definition information, and the output information of the lower-layer APIs registered in the API correspondence table. Accordingly, the linkage assistance device 5 determines that the lower-layer API 73 can be executed, and determines the execution of the lower-layer API 73. Subsequently, the linkage assistance device 5 determines the execution of the lower-layer API prior to the execution of the lower-layer API 74. Then, the linkage assistance device 5 sets the API name of the lower-layer API 73 of which the execution is determined in the lower-layer API of the API correspondence table 62. Herein, the lower-layer API 73 is the lower-layer API of which the execution is determined second, and hence the linkage assistance device 5 sets the lower-layer API 73 as the second lower-layer API in the lower-layer API section.

Figure 10:
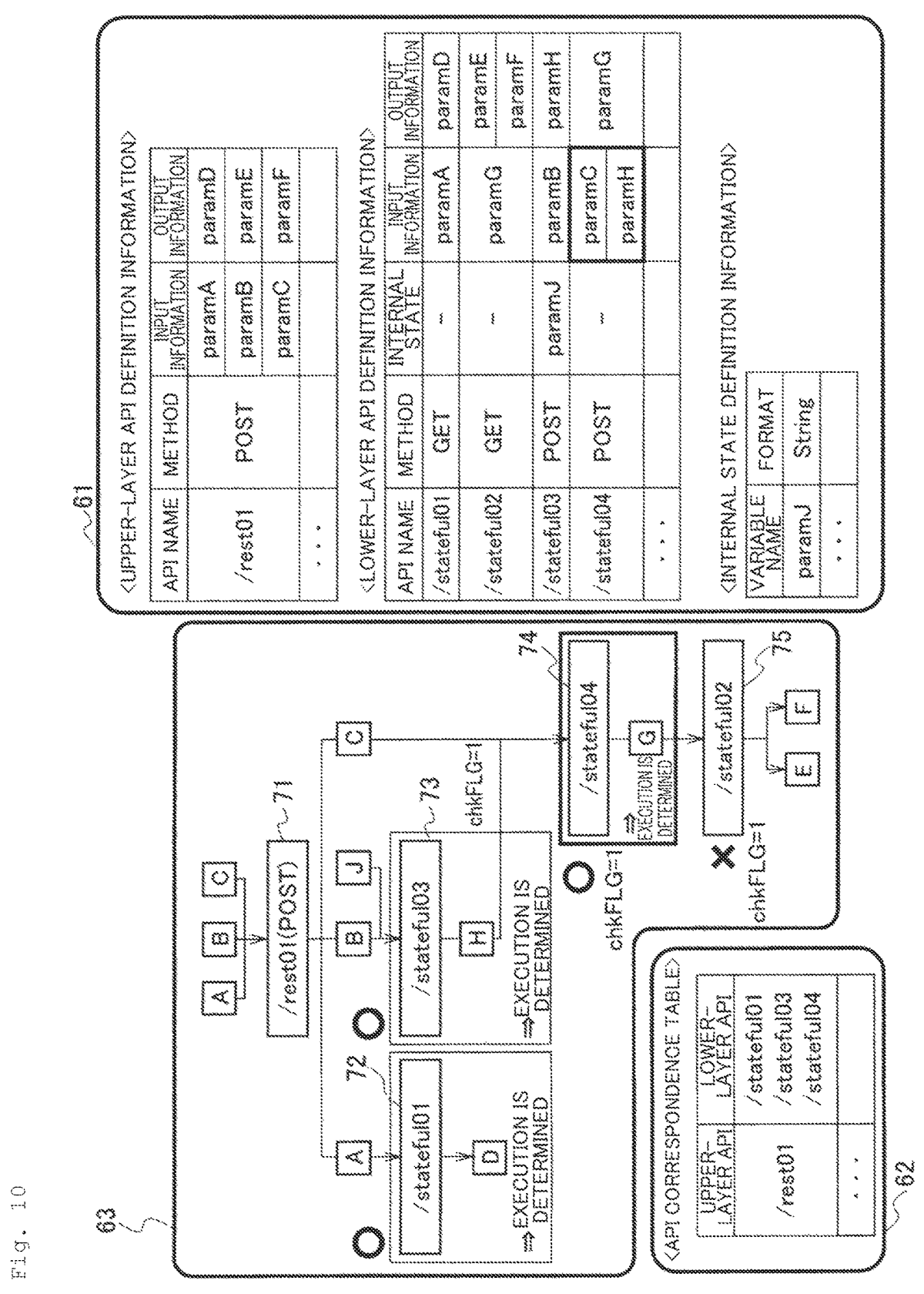

As shown in FIG. 10, the linkage assistance device 5 returns to the determination of the lower-layer API 74, and verifies the input information ("paramC", "paramH") of the lower-layer API 74 again. Specifically, the linkage assistance device 5 determines that the lower-layer API 74 can be executed by using the input information ("paramC") of the upper-layer API 71 and the output information ("paramH") of the lower-layer API 73 registered in the API correspondence table 62. Subsequently, the linkage assistance device 5 determines the execution of the lower-layer API 74 prior to the execution of the lower-layer API 75. Then, the linkage assistance device 5 sets the API name of the lower-layer API 74 of which the execution is determined in the lower-layer API of the API correspondence table 62. Herein, the lower-layer API 74 is the lower-layer API of which the execution is determined third, and hence the linkage assistance device 5 sets the lower-layer API 74 as the third lower-layer API in the lower-layer API section.

Figure 11:
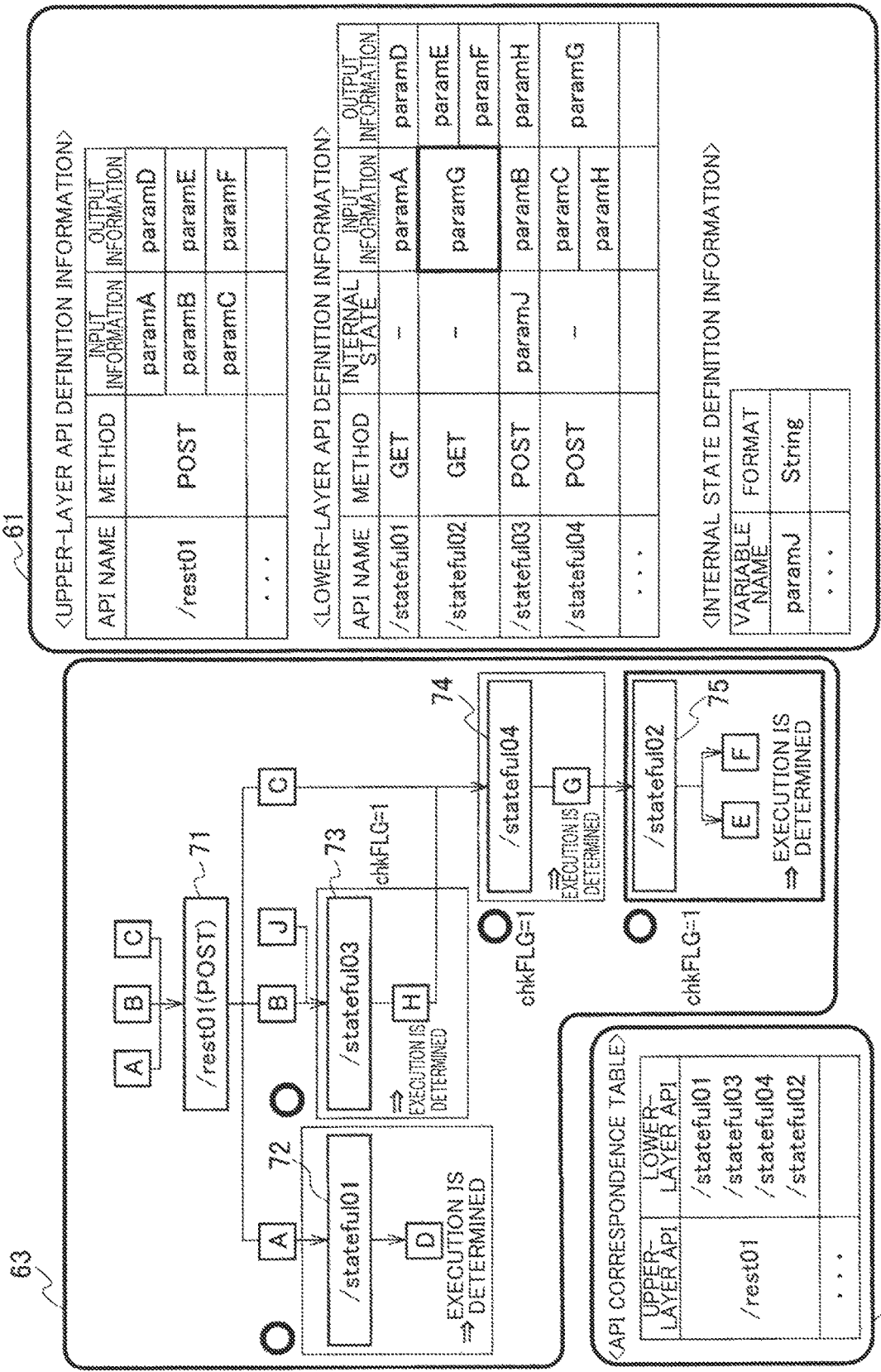
FIG. 11 is an explanatory view for explaining the specific generation procedure of the API correspondence table.

As shown in FIG. 11, next, the linkage assistance device 5 returns to the determination of the lower-layer API 75, and verifies the input information ("paramG") of the lower-layer API 75 again. Specifically, the input information ("paramG") corresponds to the execution result of the lower-layer API 74 registered in the API correspondence table 62, and hence the linkage assistance device 5 determines that the lower-layer API 75 can be executed, and determines the execution of the lower-layer API 75. Subsequently, the linkage assistance device 5 sets the API name of the lower-layer API 75 of which the execution is determined in the lower-layer API section of the API correspondence table 62. Herein, the lower-layer API 75 is the lower-layer API of which the execution is determined fourth, and hence the linkage assistance device 5 sets the lower-layer API 75 as the fourth lower-layer API in the lower-layer API information section. The linkage assistance device 5 can refer to the output information of the upper-layer API 71 and output all pieces of the output information, and hence the generation (mapping processing) of the API correspondence table of the upper-layer API 71 ("/rest01") to be processed is completed.

Operation of Service Linkage System

Figure 12:
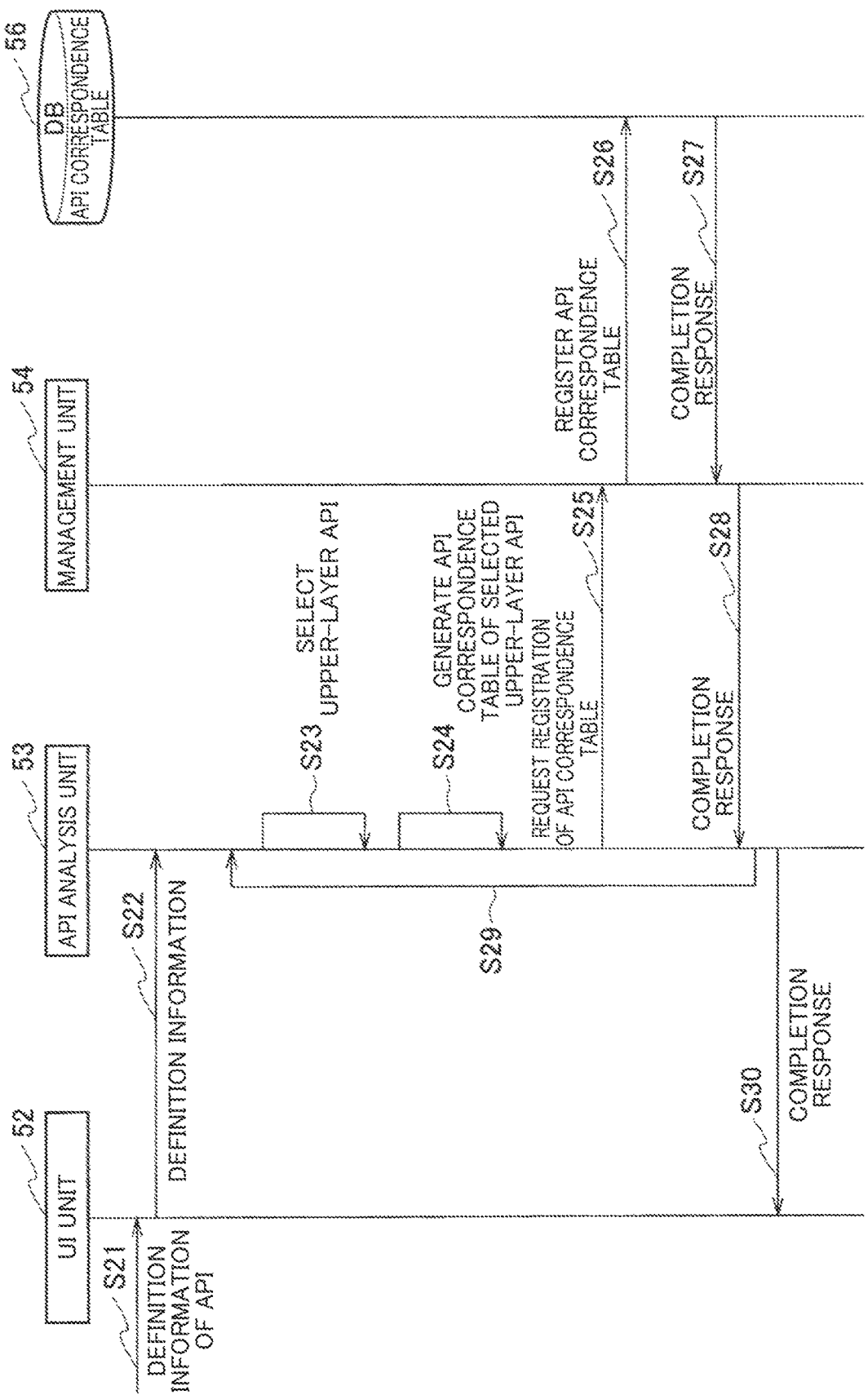
FIG. 12 is a sequence diagram showing generation of the API correspondence table.

FIG. 12 is a sequence diagram showing generation processing of the API correspondence table performed by the linkage assistance device 5. The generation processing of the API correspondence table is performed with input of the definition information by a user used as a trigger.

The UI unit 52 receives the definition information input by the user (S21), and sends the received definition information to the API analysis unit 53 (S22). The definition information includes the upper-layer API definition information, the lower-layer API definition information, and the internal state definition information.

The API analysis unit 53 selects one upper-layer API from the upper-layer API definition information (S23). The API analysis unit 53 analyzes the upper-layer API definition information, the lower-layer API definition information, and the internal state definition information corresponding to the selected upper-layer API, and generates the API correspondence table of the above upper-layer API (S24). The generation processing of the API correspondence table will be described later.

The API analysis unit 53 sends a registration request of the API correspondence table of the upper-layer API selected in S23 to the management unit 54 (S25). The management unit 54 registers the API correspondence table in the DB 56 by using, e.g., a query (S26). The DB 56 sends a registration completion response to the management unit 54 (S27). The management unit 54 sends the registration completion response to the API analysis unit 53 (S28).

In the case where the upper-layer API of which the API correspondence table is not generated is present in the upper-layer API definition information, the API analysis unit 53 returns to S23, selects the next upper-layer API, and performs the subsequent processing (S29). In the case where the API correspondence tables of all of the upper-layer APIs in the upper-layer API definition information are generated, the API analysis unit 53 sends a registration completion notification to the UI unit 52 (S30). The UI unit 52 notifies the user that the registration of the API correspondence table is completed by indicating the registration completion notification in a display.

Note that the indication in the display by the UI unit 52 may be graphical (GUI: Graphical User Interface) or text-based (CLI: Command Line Interface), and a display method does not depend on a display device.

Figure 13:
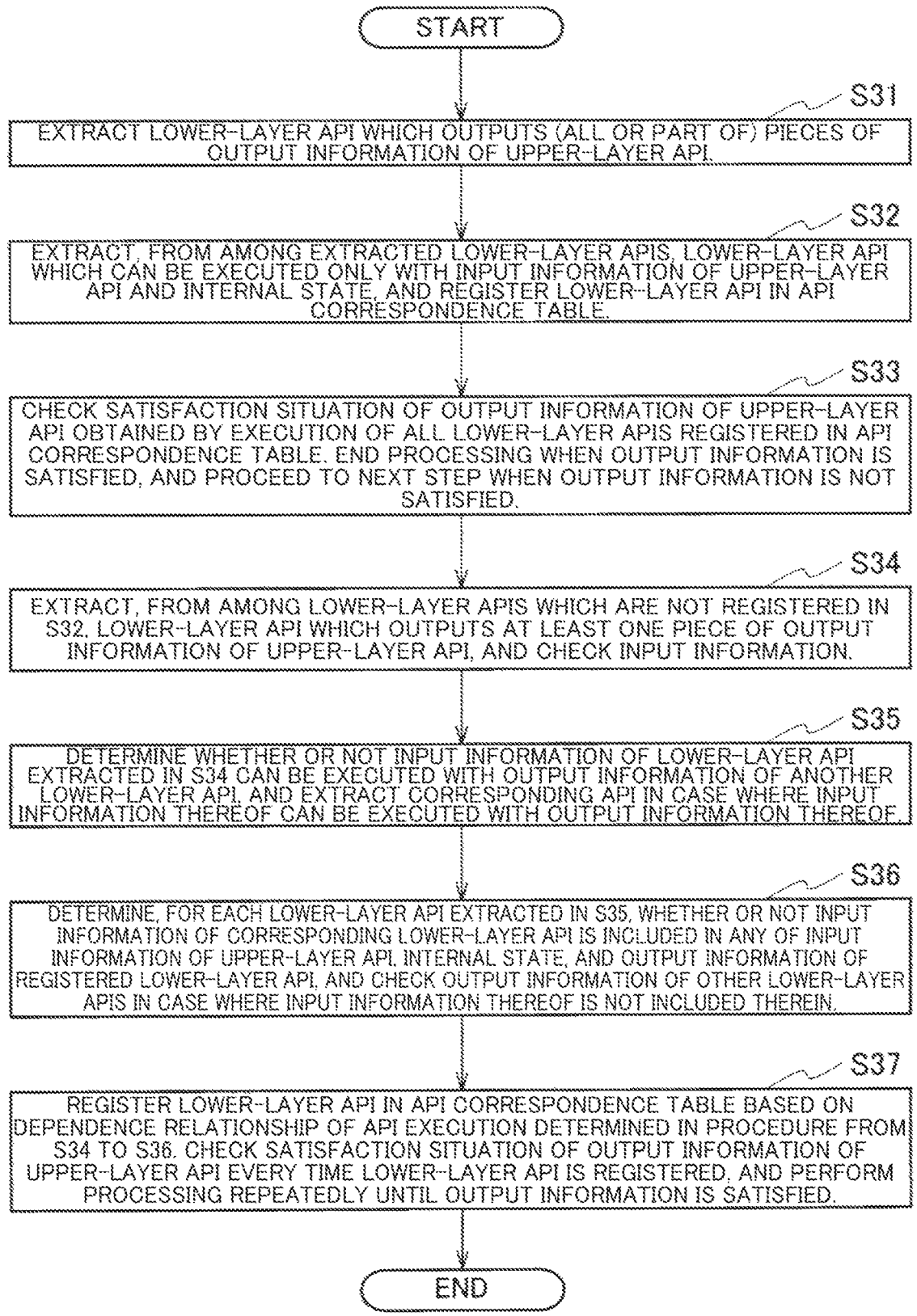
FIG. 13 is a flowchart showing the generation of the API correspondence table in detail.

FIG. 13 is a flowchart showing detailed processing in S24 in FIG. 12. The API analysis unit 53 refers to the upper-layer API definition information, the lower-layer API definition information, and the internal state definition information which are input from the UI unit 52 in S22, and performs the following processing.

The API analysis unit 53 extracts the lower-layer API which outputs (part of or all) pieces of the output information of the selected upper-layer API (S31). The API analysis unit 53 extracts, from among the extracted lower-layer APIs, the lower-layer API which can be executed only with the input information of the upper-layer API and the internal state definition information, and registers the extracted lower-layer API in the API correspondence table (S32).

The API analysis unit 53 determines whether or not all pieces of the output information of the upper-layer API are output (that is, all pieces of the output information of the upper-layer API are satisfied) by executing all of the lower-layer APIs registered in the API correspondence table (S33). In the case where all pieces of the output information of the upper-layer API are output, the API analysis unit 53 ends the generation of the API correspondence table of the selected upper-layer API. In the case where all pieces of the output information of the upper-layer API are not output, the API analysis unit 53 proceeds to S34, and verifies a dependence relationship between the lower-layer APIs.

The API analysis unit 53 extracts, from among the lower-layer APIs which are not registered in the API correspondence table in S32, the lower-layer API which outputs at least one or more pieces of the output information of the upper-layer API, and acquires the input information of the extracted lower-layer API (S34). The API analysis unit 53 extracts the lower-layer API which includes the input information of the lower-layer API extracted in S34 in the output information (S35).

The API analysis unit 53 determines, for each lower-layer API extracted in S35, whether or not all pieces of the input information of the lower-layer API are included in any of the input information of the upper-layer API, the internal state definition information, and the output information of the lower-layer API registered in the API correspondence table. In the case where all pieces of the input information are included in any of the input information of the upper-layer API, the internal state definition information, and the output information of the lower-layer API registered in the API correspondence table, the API analysis unit 53 determines that the lower-layer API can be executed and, otherwise, the API analysis unit 53 determines that the lower-layer API cannot be executed (S36).

The API analysis unit 53 extracts, from among the lower-layer APIs which are determined not to be executable, the lower-layer API which includes, in the output information, the input information which is not included in the input information of the upper-layer API, the internal state definition information, or the output information of the lower-layer API registered in the API correspondence table and, in the case where all pieces of the input information of the extracted lower-layer API are included in any of the input information of the upper-layer API, the internal state definition information, and the output information of the lower-layer API registered in the API correspondence table, the API analysis unit 53 determines that the lower-layer API can be executed.

Based on the dependence relationship of the execution of the lower-layer APIs determined in S34 to S36, the API analysis unit 53 registers the lower-layer API determined to be executable in the API correspondence table in an order in which the lower-layer API is determined to be executable (S37). The API analysis unit 53 determines whether or not all pieces of the output information of the upper-layer API are output as the output information of the lower-layer API registered in the API correspondence table every time the lower-layer API registered in the API correspondence table. The API analysis unit 53 repeatedly performs the processing from S34 to S36 until all pieces of the output information of the upper-layer API are output, and ends the processing when all pieces of the output information of the upper-layer API are output.

Figure 14:
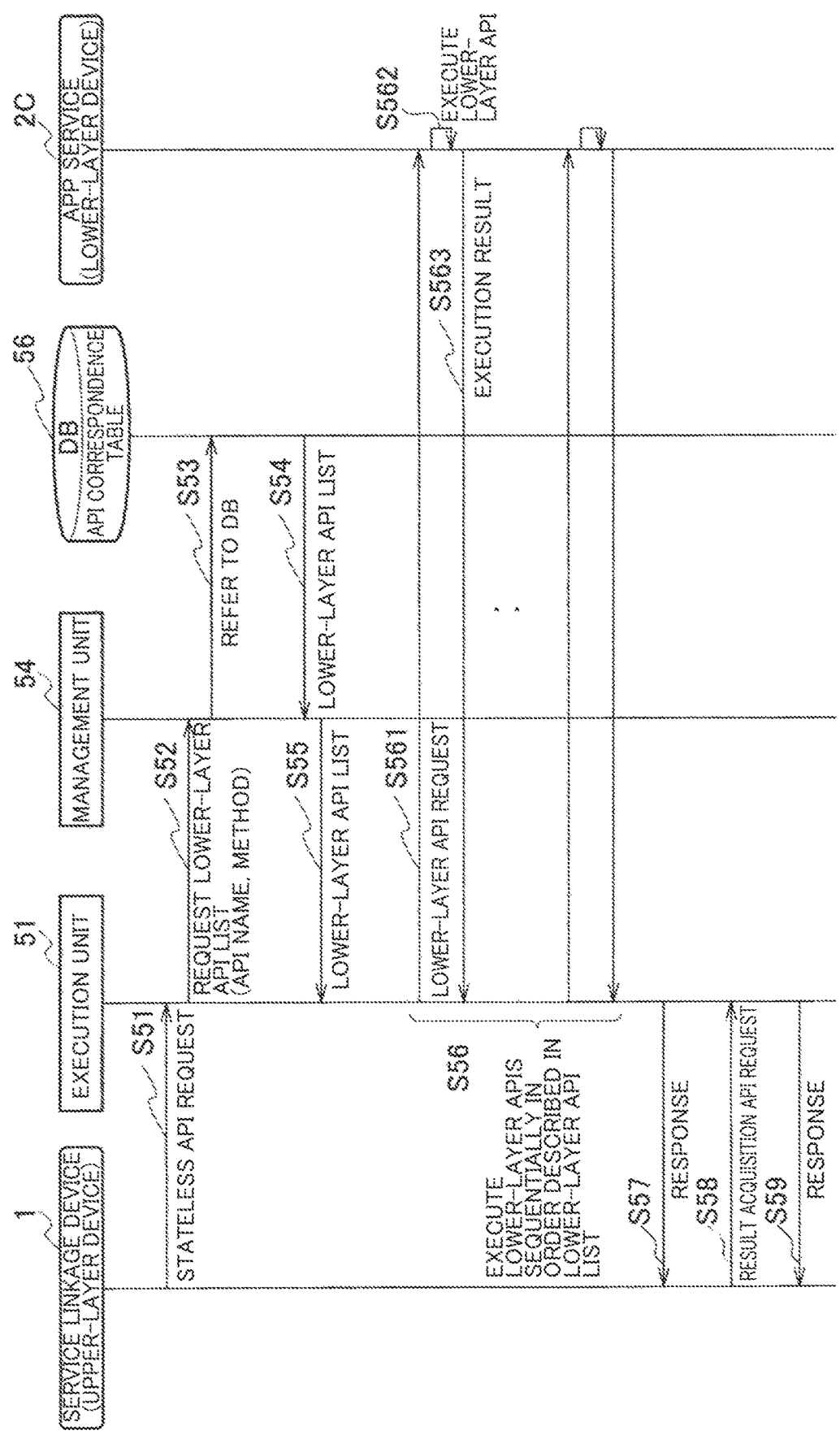
FIG. 14 is a sequence diagram showing the operation of the service linkage system.

FIG. 14 is a sequence diagram showing the operation of the service linkage system of the present embodiment during the execution of the service.

The service linkage device (upper-layer device) 1 requests a linkage catalog specified by an order (ProductOrder) for a linkage service from a client from the catalog management unit, and acquires the linkage catalog. Subsequently, the service linkage device 1 instructs the individual adaptor units of a plurality of services included in the linkage catalog to execute the lower-layer API exposed by each service.

In an example shown in the drawing, the adaptor unit of the app service 2C executes the stateless lower-layer API exposed for the app service (lower-layer device) 2C by the linkage assistance device 5. That is, the adaptor unit transmits a request for providing an instruction to execute the stateful API of the app service 2C (e.g., POST method) to the linkage assistance device 5 via the stateless upper-layer API (S51). The execution instruction request of the lower-layer API is a request for operating the app service 2C.

The execution unit 51 of the linkage assistance device 5 receives the request from the service linkage device 1, and requests the upper-layer API name included in the request and the lower-layer API list corresponding to the method from the management unit 54 (S52). The management unit 54 acquires the lower-layer API list corresponding to the API correspondence table stored in the DB 56 using the upper-layer API name and the method as search keys (S53, S54). The management unit 54 sends the acquired lower-layer API list to the execution unit 51 (S55). The lower-layer API list is specifically a list in which the lower-layer APIs in the lower-layer API section of the API correspondence table 62 in FIG. 5 are set in the order of execution.

The execution unit 51 executes the stateful lower-layer API which is exposed by the app service 2C by using the acquired lower-layer API list. That is, the execution unit 51 sequentially executes the lower-layer APIs in the order of description of the lower-layer API list (S56). Specifically, when the execution unit 51 transmits the execution instruction request of the lower-layer API, the execution unit 51 transmits a request to which the internal state stored in the storage unit 55 is added to the app service 2C, and executes the lower-layer API (S561). The app service 2C executes the lower-layer API specified by the request (S562), and transmits the execution result (response) to the execution unit 51 (S563). The execution unit 51 stores the execution result received from the lower-layer API in the storage unit 55.

Note that, at the time of the first communication with the linkage assistance device 5, the app service 2C adds the internal state such as the session information to the execution result and transmits the execution result to the execution unit 51. When the execution unit 51 acquires the internal state, the execution unit 51 registers the internal state in the storage unit 55. In the case where the internal state is not stored in the storage unit 55 such as the case where the first communication therewith is performed, the execution unit 51 may transmit the request to which the internal state is not added to the app service 2C and execute the lower-layer API.

After completing the execution of all of the lower-layer APIs in the lower-layer API list, according to the specification of the upper-layer API, the execution unit 51 transmits the execution result which is temporality stored in the storage unit 55 to the service linkage device 1. In an example shown in the drawing, the execution unit 51 notifies the service linkage device 1 that the execution unit 51 retains the execution result of the lower-layer API (S57). Specifically, the execution unit 51 transmits "201 Created" (normal response) indicating that the request has been fulfilled and creation of resources has been completed to the service linkage device 1.

When the adaptor unit 23 of the service linkage device 1 receives the response in S57, the adaptor unit 23 transmits a request (GET method) for acquiring the execution result to the linkage assistance device 5 (S58). The execution unit 51 of the linkage assistance device 5 transmits the execution result retained in the storage unit 55 to the service linkage device 1 together with 200 OK (normal response) (S59). The service linkage device 1 stores the execution result in the characteristic of the app catalog, and executes complementary processing which reflects the acquired execution result in each service constituting the linkage service according to the rule of the linkage catalog. Note that the transmission of the execution result to the service linkage device 1 is not limited to the processing from S57 to S59.

Effects of Present Embodiment

The above-described service linkage assistance device of the present embodiment has the UI unit 52 which receives the definition information of the stateless upper-layer API exposed to the service linkage device (upper-layer device) which links a plurality of the services, and the definition information of a plurality of the stateful lower-layer APIs exposed by the lower-layer device, and the interpretation unit 53 which extracts at least one lower-layer API corresponding to the upper-layer API by using the definition information of the upper-layer API and the definition information of the lower-layer APIs, and generates the API correspondence table in which the execution order of the extracted lower-layer API is set.

In the present embodiment described above, the API correspondence table in which the stateless upper-layer API and the stateful lower-layer API are associated with each other is generated by using the input definition information. With this, in the present embodiment, it is possible to easily perform mapping between the stateless upper-layer API and the stateful lower-layer API. That is, in the present embodiment, it is possible to easily link the service which exposes the stateful API to another service. Accordingly, in the present embodiment, it is possible to link a plurality of the services including the service of the stateful lower-layer API in a short period of time at low cost.

(Hardware Configuration)

Figure 15:
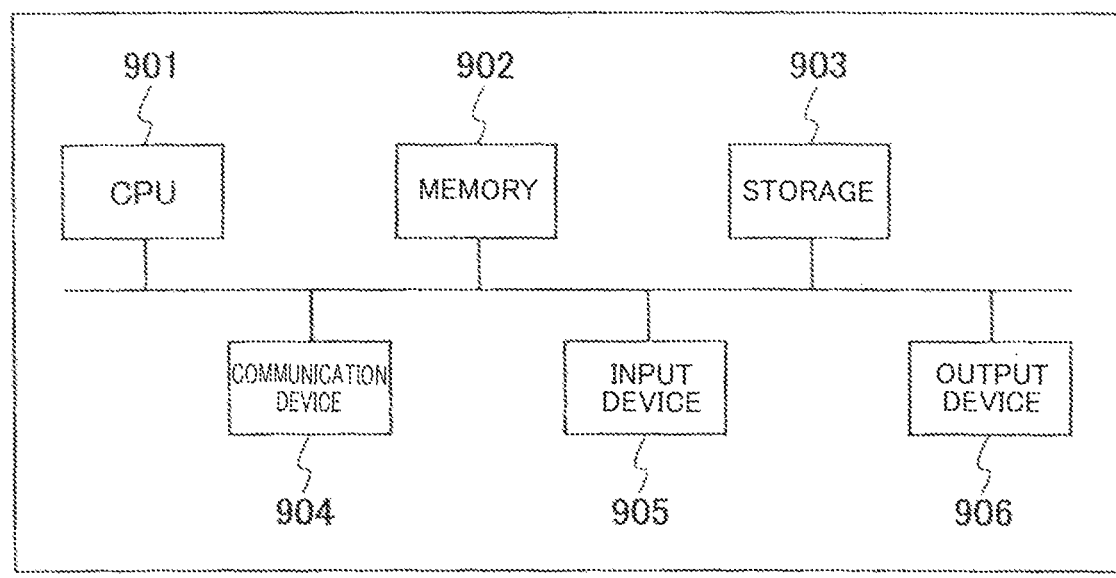
FIG. 15 is an example of a hardware configuration.

As the linkage assistance device 5 and the service linkage device 1 described above, for example, it is possible to use a general-purpose computer system shown in FIG. 15. The computer system shown in the drawing includes a CPU (Central Processing Unit, processor) 901, a memory 902, a storage 903 (HDD: Hard Disk Drive, SSD: Solid State Drive), a communication device 904, an input device 905, and an output device 906. The memory 902 and the storage 903 are storage devices. In this computer system, the CPU 901 executes a predetermined program loaded into the memory 902, and the functions of the individual devices are thereby realized. For example, with regard to the individual functions of the linkage assistance device 5 and the service linkage device 1, the CPU of the linkage assistance device 5 executes a program in the case of the program for the linkage assistance device 5 and the function of the linkage assistance device 5 is thereby realized, and the CPU of the service linkage device 1 executes a program in the case of the program for the service linkage device 1 and the function of the service linkage device 1 is thereby realized.

In addition, the linkage assistance device 5 and the service linkage device 1 may be implemented by one computer, or may also be implemented by a plurality of computers. Further, the linkage assistance device 5 and the service linkage device 1 may also be virtual machines implemented in a computer.

The program for the linkage assistance device 5 and the program for the service linkage device 1 can be stored in a computer-readable recording medium such as an HDD, an SSD, a USB (Universal Serial Bus) memory, a CD (Compact Disc), or a DVD (Digital Versatile Disc), and can also be delivered via a network.

Note that the present invention is not limited to the above embodiment and modifications, and various modifications may be made without departing from the gist thereof.

REFERENCE SIGNS LIST

1 Service linkage device (upper-layer device)
10 Catalog interpretation execution unit
21, 22, 23 Adaptor unit
30 Catalog management unit
2A, 2B, 2C Service
5 Linkage assistance device (service linkage assistance device)
51 Execution unit
52 UI unit (reception unit)
53 API analysis unit (interpretation unit)
54 Management unit
55 Storage unit
56 DB

The invention claimed is:

1. A service linkage assistance device comprising one or more processors configured to perform operations comprising:
   receiving (i) definition information of a stateless upper-layer Application Programming Interface (API) exposed to an upper-layer device that links a plurality of services and (ii) definition information of a plurality of stateful lower-layer APIs exposed by a lower-layer device;
   extracting a first lower-layer API corresponding to the upper-layer API by using the definition information of the upper-layer API and the definition information of the lower-layer APIs;
   determining, based on the definition information of the upper-layer API and the definition information of the lower-layer APIs, that input information of the first lower-layer API is included in the input information of the upper-layer API;
   determining that the first lower-layer API is associated with a priority in an execution order of the plurality of lower-layer APIs; and
   generating an API correspondence table comprising (a) the plurality of lower-layer APIs including the first lower-layer API and (b) the execution order where the first lower-layer API is associated with the priority.

2. The service linkage assistance device according to claim 1, wherein the operations comprise:
   receiving definition information of an internal state that is provided by notification when the first lower-layer API is executed, and generating the API correspondence table by using the definition information of the internal state.

3. The service linkage assistance device according to claim 1, wherein the operations further comprise:
   identifying a stateful lower-layer API corresponding to the upper-layer API by using the API correspondence table in response to a request from the upper-layer device, and executing the identified lower-layer API in an order specified by the API correspondence table; and
   storing an internal state included in a response of the stateful lower-layer API.

4. A service linkage assistance method performed by a service linkage assistance device, the service linkage assistance method comprising:
   receiving (i) definition information of a stateless upper-layer API exposed to an upper-layer device that links a plurality of services and (ii) definition information of a plurality of stateful lower-layer APIs exposed by a lower-layer device;
   extracting a first lower-layer API corresponding to the upper-layer API by using the definition information of the upper-layer API and the definition information of the lower-layer APIs;
   determining, based on the definition information of the upper-layer API and the definition information of the lower-layer APIs, that input information of the first lower-layer API is included in the input information of the upper-layer API;
   determining that the first lower-layer API is associated with a priority in an execution order of the plurality of lower-layer APIs; and
   generating an API correspondence table comprising (a) the plurality of lower-layer APIs including the first lower-layer API and (b) the execution order where the first lower-layer API is associated with the priority.

5. The service linkage assistance method according to claim 4, further comprising:
   identifying a stateful lower-layer API corresponding to the upper-layer API by using the API correspondence table in response to a request from the upper-layer device;
   executing the identified lower-layer API in an order specified by the API correspondence table; and
   storing an internal state included in a response of the stateful lower-layer API.

6. The service linkage assistance method according to claim 4, comprising:
   receiving definition information of an internal state that is provided by notification when the first lower-layer API is executed, and
   generating the API correspondence table by using the definition information of the internal state.

7. A non-transitory, computer-readable medium storing one or more instructions executable by a computer system to perform operations comprising:
   receiving (i) definition information of a stateless upper-layer API exposed to an upper-layer device that links a plurality of services and (ii) definition information of a plurality of stateful lower-layer APIs exposed by a lower-layer device;
   extracting a first lower-layer API corresponding to the upper-layer API by using the definition information of the upper-layer API and the definition information of the lower-layer APIs;
   determining, based on the definition information of the upper-layer API and the definition information of the lower-layer APIs, that input information of the first lower-layer API is included in the input information of the upper-layer API;

determining that the first lower-layer API is associated with a priority in an execution order of the plurality of lower-layer APIs; and generating an API correspondence table comprising (a) the plurality of lower-layer APIs including the first lower-layer API and (b) the execution order where the first lower-layer API is associated with the priority.

* * * * *